US008631959B2

(12) United States Patent
Yang et al.

(10) Patent No.: US 8,631,959 B2
(45) Date of Patent: Jan. 21, 2014

(54) CANISTER WITH LEVER ACTUATED LATCH

(75) Inventors: Frank Yang, Rancho Palos Verdes, CA (US); Joseph Sandor, Santa Ana Heights, CA (US)

(73) Assignee: Simplehuman LLC, Torrance, CA (US)

( * ) Notice: Subject to any disclaimer, the term of this patent is extended or adjusted under 35 U.S.C. 154(b) by 0 days.

(21) Appl. No.: 13/095,747

(22) Filed: Apr. 27, 2011

(65) Prior Publication Data

US 2011/0259889 A1    Oct. 27, 2011

Related U.S. Application Data

(60) Provisional application No. 61/328,588, filed on Apr. 27, 2010.

(51) Int. Cl.
| | |
|---|---|
| *B65D 45/20* | (2006.01) |
| *B65D 25/32* | (2006.01) |
| *B65F 1/14* | (2006.01) |
| *B25G 1/10* | (2006.01) |

(52) U.S. Cl.
CPC ............ *B65F 1/1615* (2013.01); *B65D 25/325* (2013.01); *B25G 1/102* (2013.01)
USPC .......................................... 220/318; 220/756

(58) Field of Classification Search
CPC ...... A45C 13/28; A45C 13/26; B65D 25/325; B65D 25/32; B25G 1/102; B25G 1/10; B65F 1/1615
USPC .............. D34/10, 8, 7; 220/764, 752, 495.06, 220/495.01

IPC .. B65D 45/20,45/16, 25/32, 25/28; B25G 1/10, B25G 1/00
See application file for complete search history.

(56) References Cited

U.S. PATENT DOCUMENTS

| | | | | |
|---|---|---|---|---|
| 830,182 | A | * | 9/1906 | Skov .............................. 220/569 |
| 1,350,713 | A | * | 8/1920 | Ferdon .......................... 292/247 |
| 1,546,131 | A | * | 7/1925 | Hechler ........................ 220/753 |
| 1,714,394 | A | * | 5/1929 | Miniere ........................ 220/324 |
| 1,765,072 | A | * | 6/1930 | Hashimoto ................... 220/318 |

(Continued)

FOREIGN PATENT DOCUMENTS

JP        2007302270 A  * 11/2007  ............. B65D 45/18

OTHER PUBLICATIONS

Translation of JP 2007-302270 (Fujii et al.) Nov. 22, 2007, Paragraphs 23-27.*

*Primary Examiner* — Robert J Hicks
(74) *Attorney, Agent, or Firm* — Liu & Liu (57) ABSTRACT

A canister includes a body having a shell, a lid, and a handle mechanism. The handle mechanism includes a lever that actuates to engage and disengage a latch pivoted on the lever for locking and unlocking the lid to the body. The lever mates to a fixed handle portion to complete a handle for facilitating handling of the canister. The canister can further include wheels for transporting the canister. The lid can include an elastic portion to press against the body to create a seal. The canister can further include a utensil attached to the underside of the lid, for use to scoop the content from the canister.

22 Claims, 14 Drawing Sheets

(56) References Cited

U.S. PATENT DOCUMENTS

| | | | | |
|---|---|---|---|---|
| 2,593,971 A * | 4/1952 | Brandt | ............... | 292/128 |
| 2,738,900 A * | 3/1956 | Wenger | ............... | 141/380 |
| 3,008,745 A * | 11/1961 | Tomkinson et al. | ............... | 292/113 |
| 3,471,054 A * | 10/1969 | Ostrowsky et al. | ............... | 220/318 |
| 4,691,840 A * | 9/1987 | Ferbrache | ............... | 220/318 |
| 4,819,827 A * | 4/1989 | DiSesa | ............... | 220/318 |
| 5,103,994 A * | 4/1992 | Doxey et al. | ............... | 220/324 |
| 5,160,060 A * | 11/1992 | Garofalo, Jr. | ............... | 220/318 |
| 5,638,984 A * | 6/1997 | Munari | ............... | 220/750 |
| 6,824,004 B1 * | 11/2004 | Wooderson | ............... | 220/318 |

* cited by examiner

CANISTER WITH LEVER ACTUATED LATCH

CROSS REFERENCE TO RELATED APPLICATIONS

This application claims the priority of Provisional Patent Application No. 61/328,588, which was filed Apr. 27, 2010. This earlier application and all patent documents and other publications disclosed herein below are fully incorporated by reference, as if fully set forth herein.

BACKGROUND OF THE INVENTION

1. Field of the Invention

The present disclosure is in the field of canister or container.

2. Description of Related Art

Canisters are generally used for storing dry food content. Some canisters can be large in size to store large amounts of food. These large size canisters can be cumbersome to transport due to their large size and weight. Under some undesired occurrences, canisters can be opened accidentally by pets or children. Thus, there is a need for pet and child proof canisters that are easy to transport. Also, since canisters are generally used to store food content, the interior of the canister needs to be substantially air tight to help prevent the food content from becoming perished.

SUMMARY OF THE INVENTION

One aspect of the invention provides a canister. The canister may comprise a body comprising a shell, a lid, and a handle mechanism. The handle mechanism may comprise a lever that actuates by pivoting to engage and disengage a latch pivotally attached to the lever for locking and unlocking the lid to the body. The canister can further include wheels for transporting the canister. The lid can include an elastic portion to press against the body to create a seal. The canister can further include a utensil attached for scooping the content from the canister.

BRIEF DESCRIPTION OF THE DRAWINGS

The foregoing and other features of the present disclosure will become more fully apparent from the following description and appended claims, taken in conjunction with the accompanying drawings. Understanding that these drawings depict only some embodiments in accordance with the disclosure and are, therefore, not to be considered limiting of their scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

In embodiments of the present disclosure, a canister or a container is provided. The canister includes a shell and the shell has an interior for storing food contents, such as pet food. The canister has a lid, where the lid closes and locks to provide a substantially air-tight seal. The canister also has a handle mechanism for actuating a latch that locks and unlocks the lid. In the embodiments, the bottom to up pivoting of the handle mechanism to actuate the latch helps to prevent accidental unintended opening of the lid by pets or children. In some embodiments, a separate liner or bucket can be placed inside the body. The canister can further include wheels for easily transporting the canister. The canister can further include a utensil, such as a scoop or spoon, attached for scooping and removing the content stored inside the canister.

Figure 1:
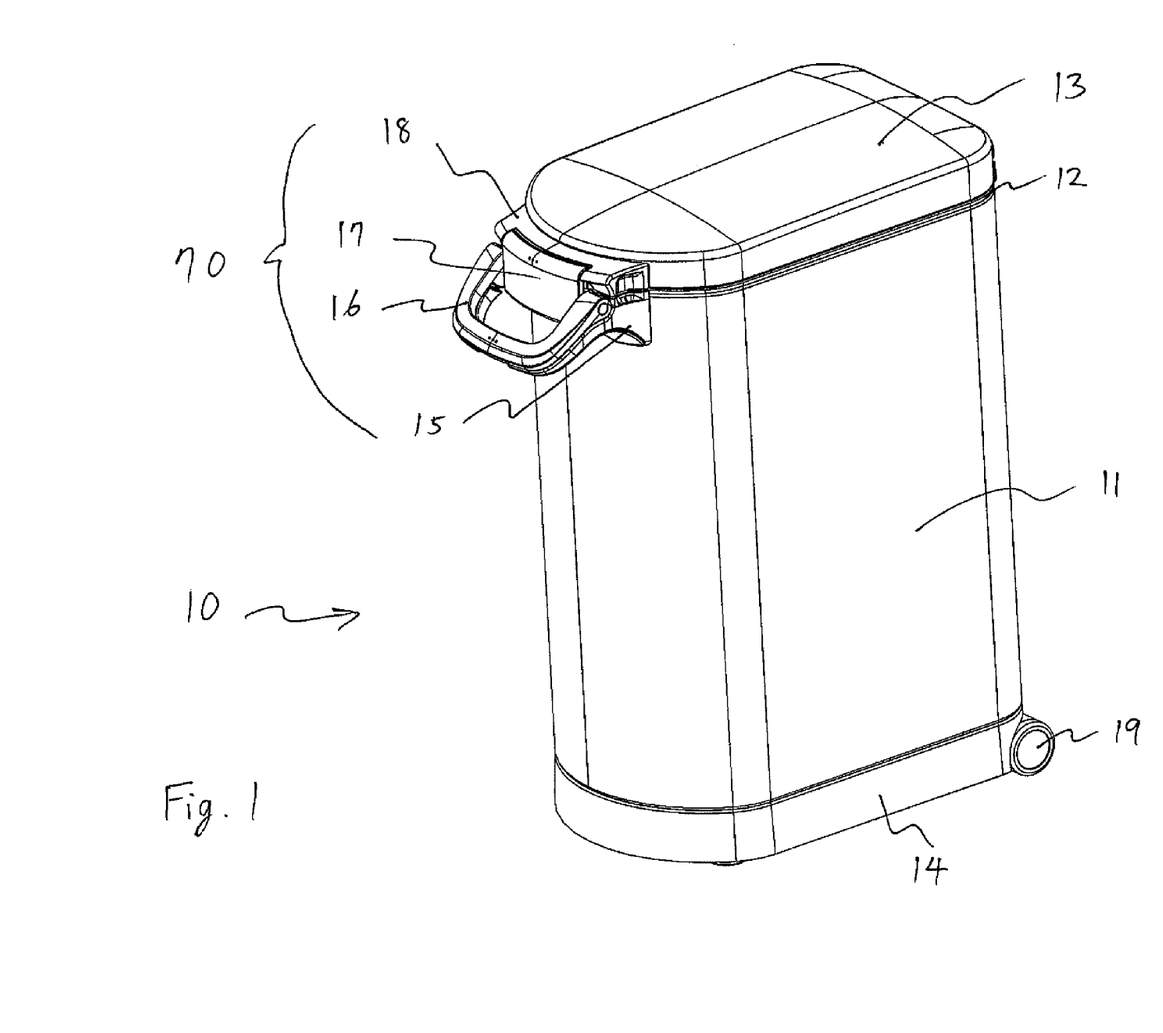
FIG. 1 illustrates an embodiment of a canister.

FIG. 1 illustrates an embodiment of a canister or container 10. The canister 10 includes a body 11 comprising a shell defining the general shape and capacity of the canister 10. Although FIG. 1 illustrates the body 11 as a slim configuration, the body 11 can comprise any shape, such as oval, circle, rectangular, and semi-round, etc. The body 11 can be made of metal (e.g., steel, aluminum, alloys, etc.), synthetic material (e.g., silicone, rubber, plastics, polymeric materials) or natural material (e.g., wood, bamboo, etc.) The body 11 includes at least one opening for inserting/removing content therethrough.

In the embodiment, the canister 10 includes a trim 12 that is secured to the body 11 along the opening. In some embodiments, the body 11 can have a roll or protrusion on the edge of the opening, so that the trim 12 that have hooks engage the roll or protrusion of the body 11. The trim 12 generally provides an interface between the body 11 and a lid. The trim 12 can be made of easily moldable material such as plastics.

The canister 10 further includes a lid 13 to cover the opening of the body 11. In the embodiment, the lid 13 closes and is seated on the trim 12. In other embodiments, the lid 13 can close on the body 11 without a trim 12. In the illustrated embodiment, the lid 13 is pivotably connected to the body 11 via a hinge. Although not illustrated, the lid 13 can be actuated to open and close by a foot pedal. In other embodiments, the lid 13 can be removably connected to the body 11. The lid 13 can be made of metal, stainless steel, or plastic.

In the embodiment, the body 11 has a separate opening on the bottom portion and the canister 10 further includes a base 14 secured to the body 11 to cover the opening on the bottom portion. In some embodiments, the body 11 can have a roll or protrusion on the edge of the opening on the bottom portion, so that the base 14 that have hooks engage the roll or protrusion of the body 11. The base 14 provides an interface for the canister 10 to sit or move along the floor. In other embodiments, the body 11 can have a closed bottom portion. The base 14 can be made of easily moldable material such as plastics. In the illustrated embodiment, the canister 10 further includes wheels 19 attached to the base 14 for ease of transporting the canister 10.

Still in the illustrated embodiment of FIG. 1, the canister 10 includes a handle mechanism 70. The handle mechanism 70 is used to lift the canister 10 and move the canister 10. Furthermore, the handle mechanism 70 actuates to lock and unlock the lid 13 with the body 11. The handle mechanism 70 comprises a handle frame 15, a lever 16, a latch 17, and an engaging member 18. The handle frame 15 is secured to the body 11 and the engaging member 18 is secured to the lid. The lever 16 is pivotably connected to the handle frame 15 and the pivoting of the lever 16 further actuates the latch 17. The actuation of the latch 17 can engage/disengage with the engaging member 18 to lock/unlock the lid 13 with the body 11. In some embodiments, the handle frame 15 can be incorporated in the body 11 as one single part and the engaging member 18 can be incorporated in the lid 13 as one single part. The actuation and further details of the handle mechanism 70 will be described in detail from FIG. 5 to FIG. 7. The handle mechanism 70 can be made from moldable material such as plastics.

Figure 2:
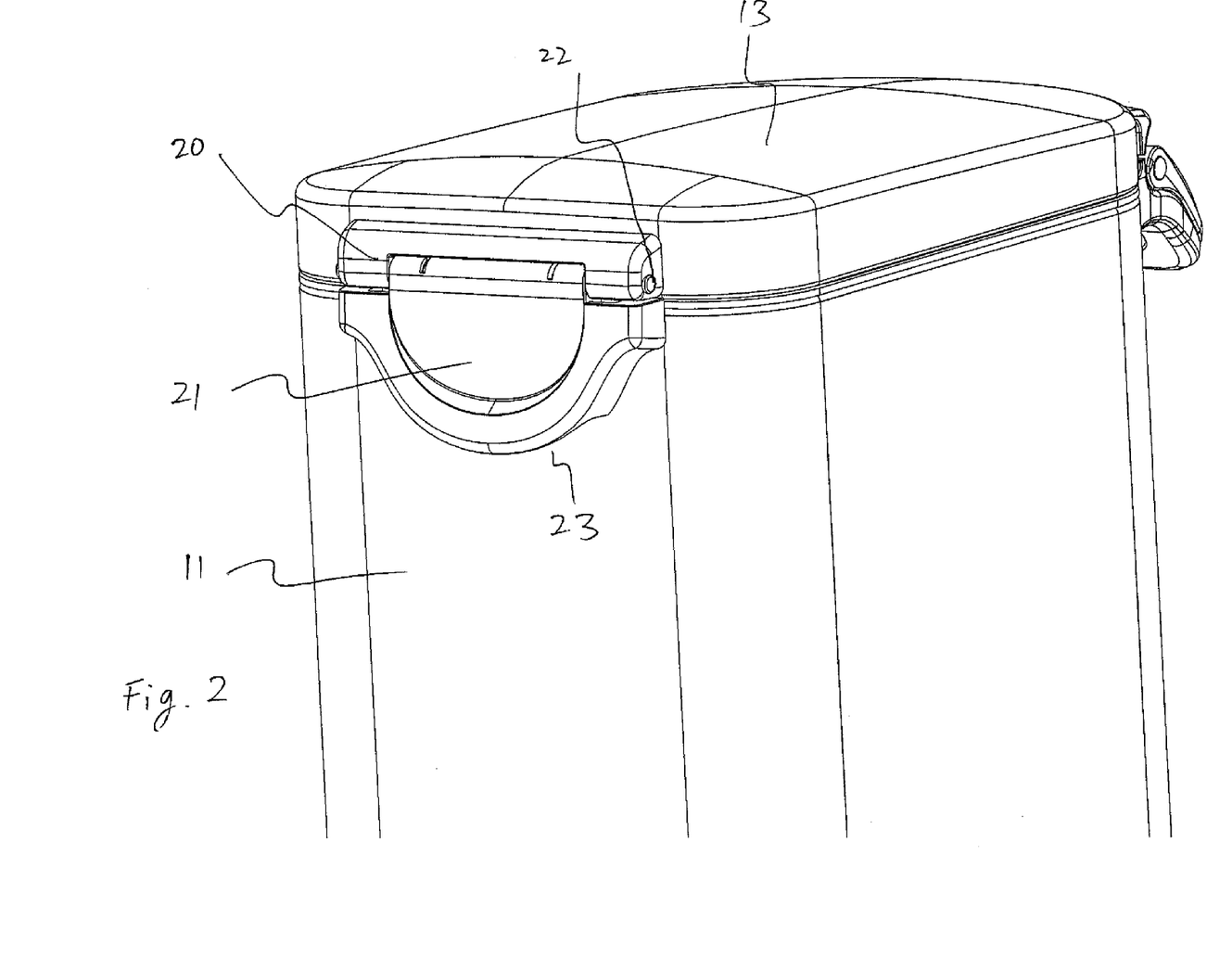
FIG. 2 illustrates a rear view of the canister.

In FIG. 2, a rear portion of an embodiment of the canister 10 is shown. In the embodiment, a lid hinge member 20 is secured to the lid 13 and a body hinge member 21 is secured to the body 11. In other embodiments, the lid hinge member 20 can be incorporated on the lid 13 as a single part and the body hinge member 21 can incorporated on the body 11 as a single part. In the illustrated embodiment, the lid hinge member 20 and the body hinge member 21 have overlapping portions with each other and have mating through holes in the overlapping portions. For example, the lid hinge member 20 has a recess in the middle portion. The body hinge member 21 has a protruding portion with shape corresponding to the recess of the lid hinge member 20 and the protruding portion inserted in the recess. The lid hinge member 20 and the body hinge member 21 have through holes in these portions so that a pin 22 can be inserted through the through holes for connecting the lid hinge member 20 and the body hinge member 21. The lid hinge member 20 and the body hinge member 21 are connected via inserting the pin 22 through the through holes, so that the lid 13 is rotatably connected to the body 11. In other embodiments, the lid hinge member 20 and the body hinge member 21 can be snapped with one another without a pin. The snapping surfaces of the members 20 and 21 can be smooth and/or round surfaces so that they allow the lid 13 to be rotatable with respect to the body 11. In some embodiments, the body hinge member 21 can also serve as a rear handle for lifting the canister 10. The body hinge member 21 can have a recess or groove 23 on the bottom for users of the canister 10 to insert their fingers inside the recess 23 for helping to lift the canister 10.

Figure 3:
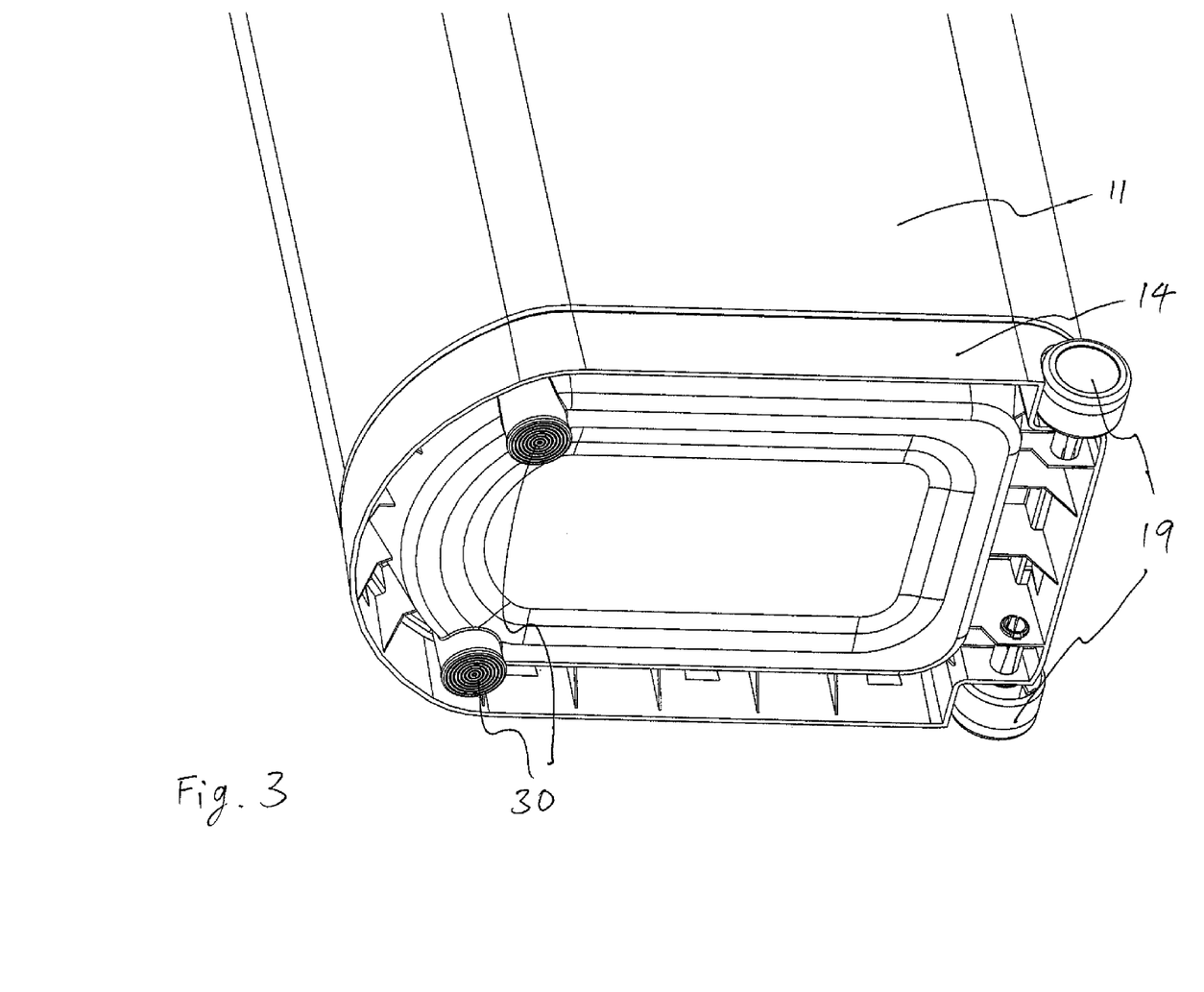
FIG. 3 illustrates a bottom view of the canister.

FIG. 3 illustrates a bottom portion of an embodiment of the canister 10. In the embodiment, the base 14 includes the wheel 19 for moving the canister 10 along a surface or floor. In the illustrated embodiment, two wheels 19 are in the rear portion of the canister 10, so that lifting the front portion of the canister 10 (the handle mechanism 70 in the front portion) allows rolling of the canister 10 via the wheels 19 in the rear portion. However, in other embodiments, different number of wheels 19 can be secured to the canister 10 and the wheels 19 can be mounted on any portion of the canister 10. The canister 10 can also include feet 30 to help prevent the canister 10 from skidding or rolling when the feet 30 are contacting the ground (in a resting, non-moving state.) The feet 30 are generally spaced apart from the wheels 19 so that they do not interfere with rolling of the wheels 19 when the canister 10 is being moved. The feet 30 can be made from materials such as rubber or silicon that provide a substantially rough or sticky surface and provide friction against the floor where the canister 10 rests.

Figure 4:
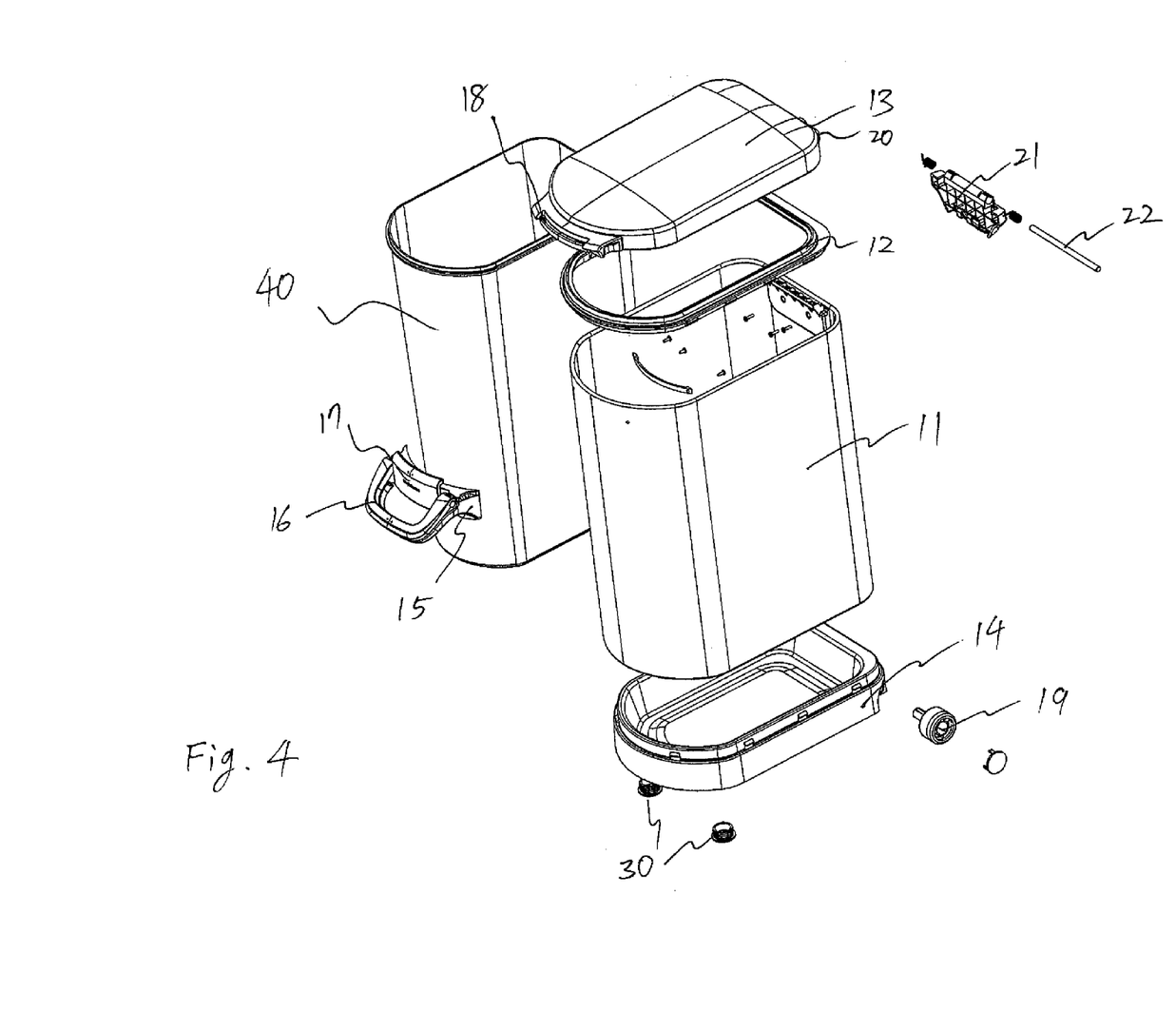
FIG. 4 illustrates an exploded view of the canister.

FIG. 4 illustrates an exploded view of an embodiment of the canister 10. This illustration is provided for providing details of the canister 10 where the components of the canister 10 are spaced part and is not intended to limit the number of components or assembly process of the canister 10 in anyway. In the embodiment, a liner 40 is provided inside the canister 10. Content or food product can be deposited and contained within the liner 40. The liner 40 can be removable from the canister 10, so that the liner 40 can be cleaned easily. The liner 40 can be made of materials such as plastic, glass, or metal. The liner 40 can be made in any shape, but preferably made in shape corresponding to the shape of the body 11. In one embodiment, the liner 40 can be seated on the base 14. In one embodiment, the liner 40 can include a lip so that the lip is seated on top of the trim 12 for support. In some embodiments, content or food product can be contained in the body 11 without the liner 40.

Figure 5:
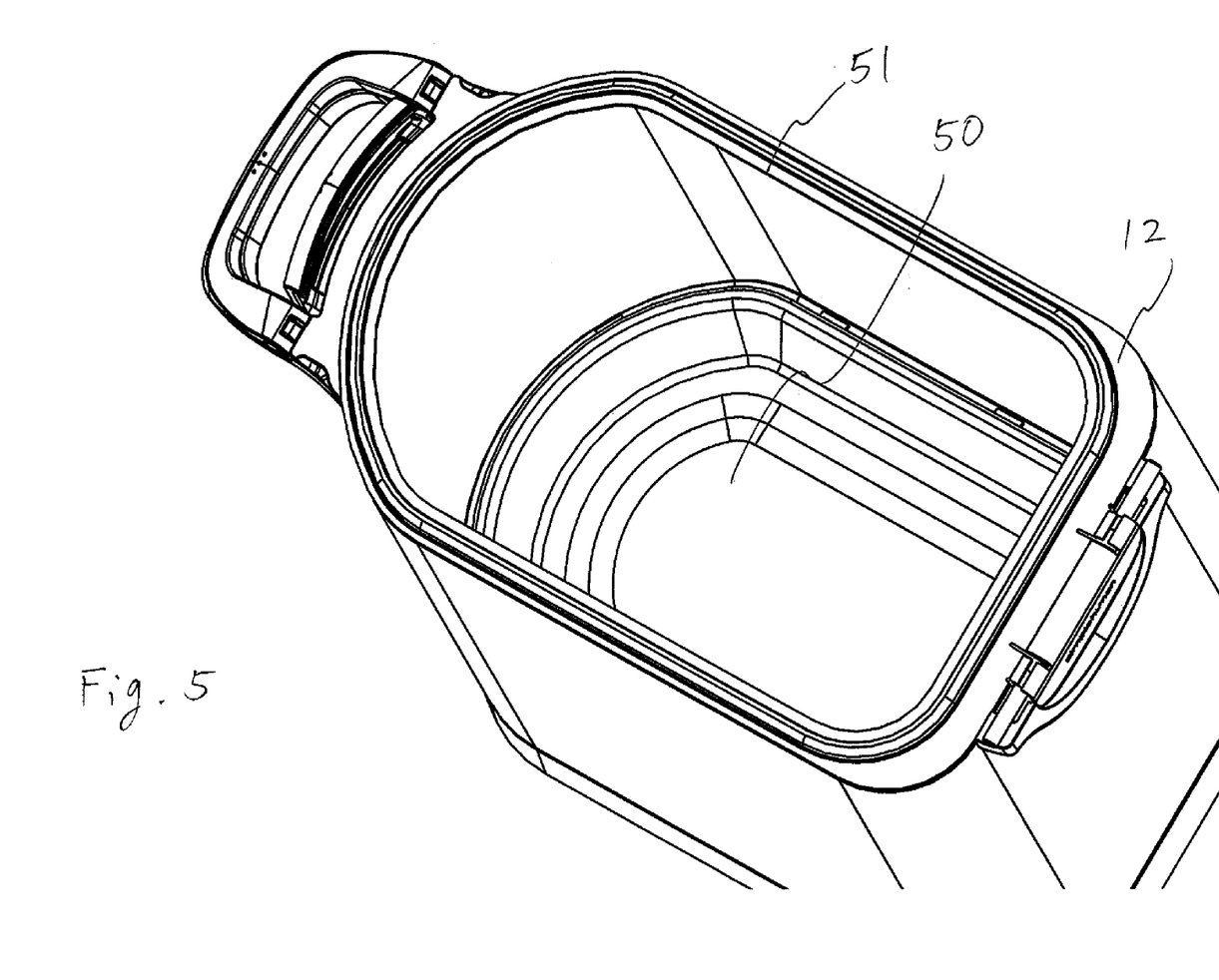
FIG. 5 illustrates an interior view of the canister.

FIG. 5 shows an embodiment of the canister 10 with the lid 13 and the liner 40 removed for sake of illustration and discussion of the interior of the canister 10. In the embodiment, the canister 10 includes the base 14 with a top surface 50. In some embodiments, the liner 40 can be seated on the top surface 50 of the base 14 for support. Although not shown, the canister 10 can have a support member to support the liner 40 in a raised position above the trim 12 for ease of cleaning or removing the content inside the liner 40. In the embodiment, the trim 12 includes a lip 51 extending toward the interior of the canister 10 so that the liner 40 (not shown in FIG. 5) including an outward extending lip can be seated on lip 51 of the trim 12. Although not shown, the trim 12 can include at least one cut toward the bottom so that at least a portion of the liner 40 is revealed in the cut for ease of grabbing the liner 40. In some embodiments, the liner 40 may not be included in the canister 10 and food or content can be deposited in the interior of the body 11. In some embodiments, a bag can be inserted in the canister 10 and the content can be stored in the bag.

Figure 6A:
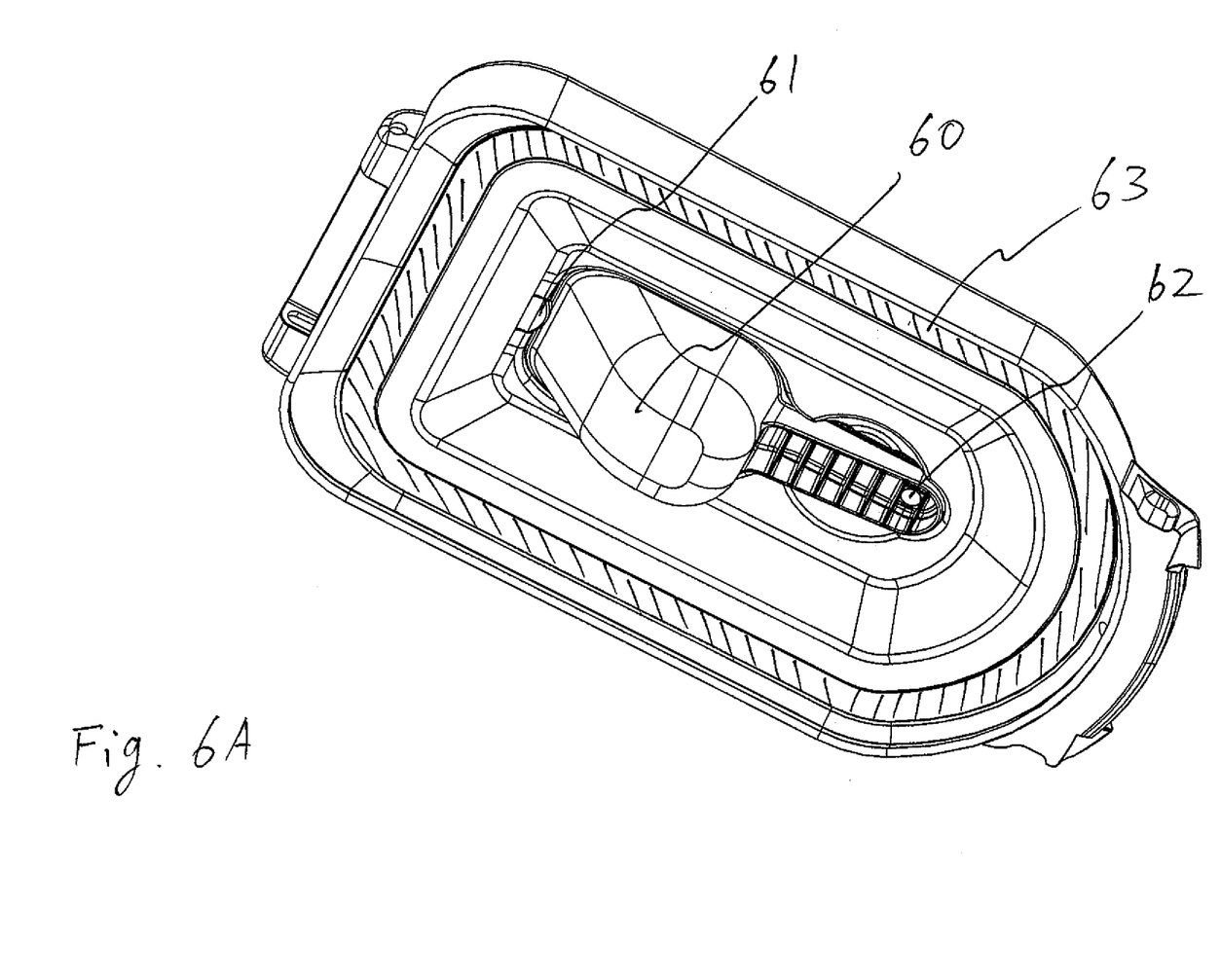
FIGS. 6A and 6B illustrate details of an embodiment of a lid of the canister.
Figure 6B:
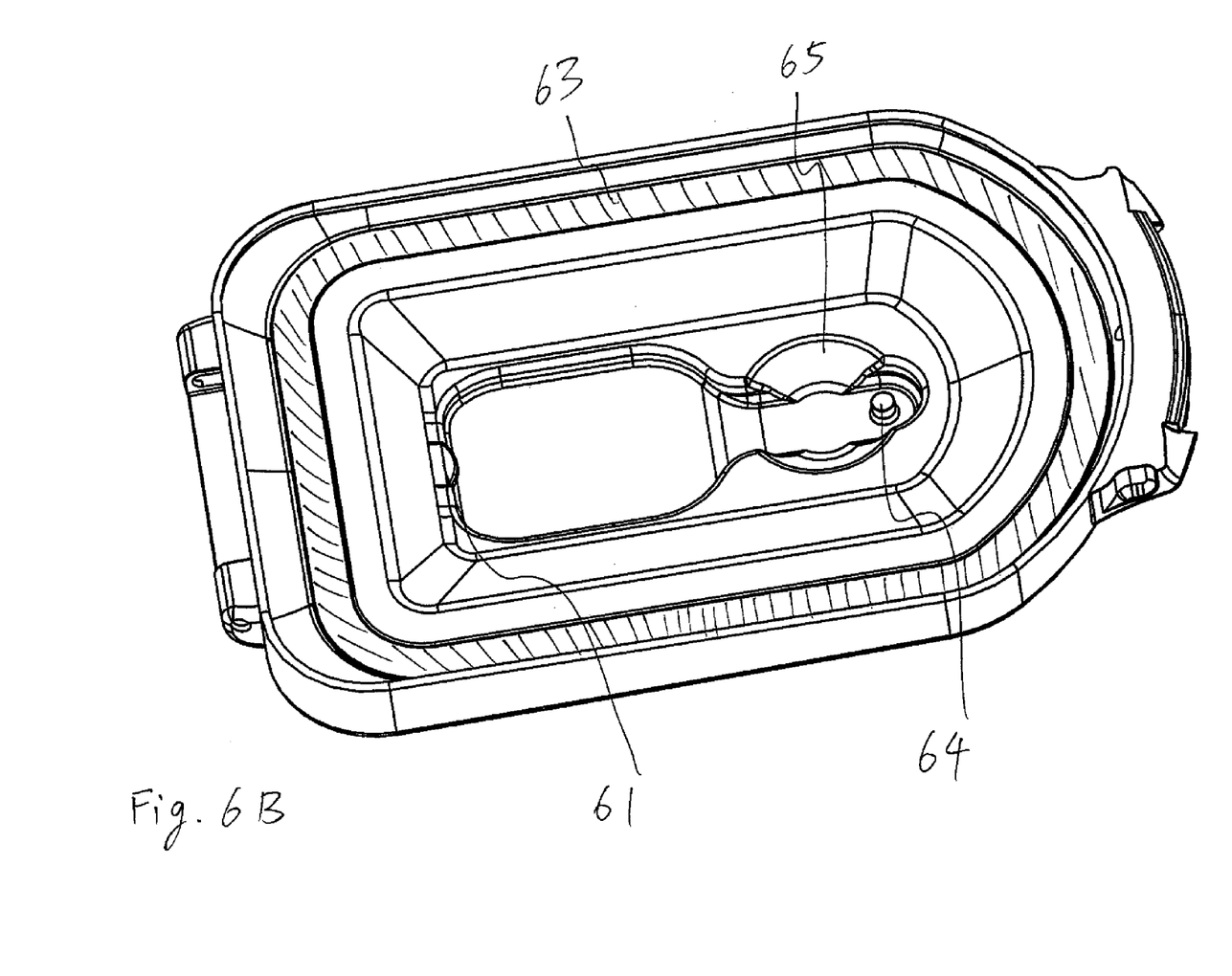

FIGS. 6A and 6B illustrate an embodiment of the lid 13 of the canister 10, particularly the underneath portion of the lid 13. In FIG. 6A, a utensil 60, such as a scooper or a spoon, is removably attached to the bottom portion (underneath) of the lid 13. In the illustrated embodiment, front portion of the utensil 60 is held in place by a rib 61 of the lid 13, by inserting the front portion of the utensil 60 under a gap between the rib 61 and surface of the lid 13. The utensil 60 further includes a metal piece 62 secured to the handle portion. The metal piece 62 is latched on to a magnet 64 (shown in FIG. 6B) on the lid 13 so that the utensil 60 is supported by the rib 61 and the magnet 64 on the lid 13 to be secured. Once attached, the utensil 60 can be easily detached by unlatching the handle portion from the magnet 64. In some embodiments, the metal piece 62 may be another magnet with proper polarity to latch on to the magnet 64 of the lid 13. In the embodiment, the lid 13 includes an elastic or rubbery seal portion 63 that presses against the liner 40 and/or the trim 12 to help create a substantially air tight seal between the lid 13 and the body 11. The outline of the seal portion 63 follows the top surface of the trim 12 and/or the liner 40. In some embodiments, the seal portion 63 can be incorporated on the lid 13. The seal portion 63 can be made of material such as rubber, silicon, or soft plastics (such as delrin) that can deform to press against a surface of the trim 12 and/or the liner 40 and bounce back to its original shape due to its resiliency. The lid 13 further includes a recess 65 around the handle portion of the utensil 60 for ease of grabbing and attaching/removing the utensil 60 from the lid 13.

Figure 7A:
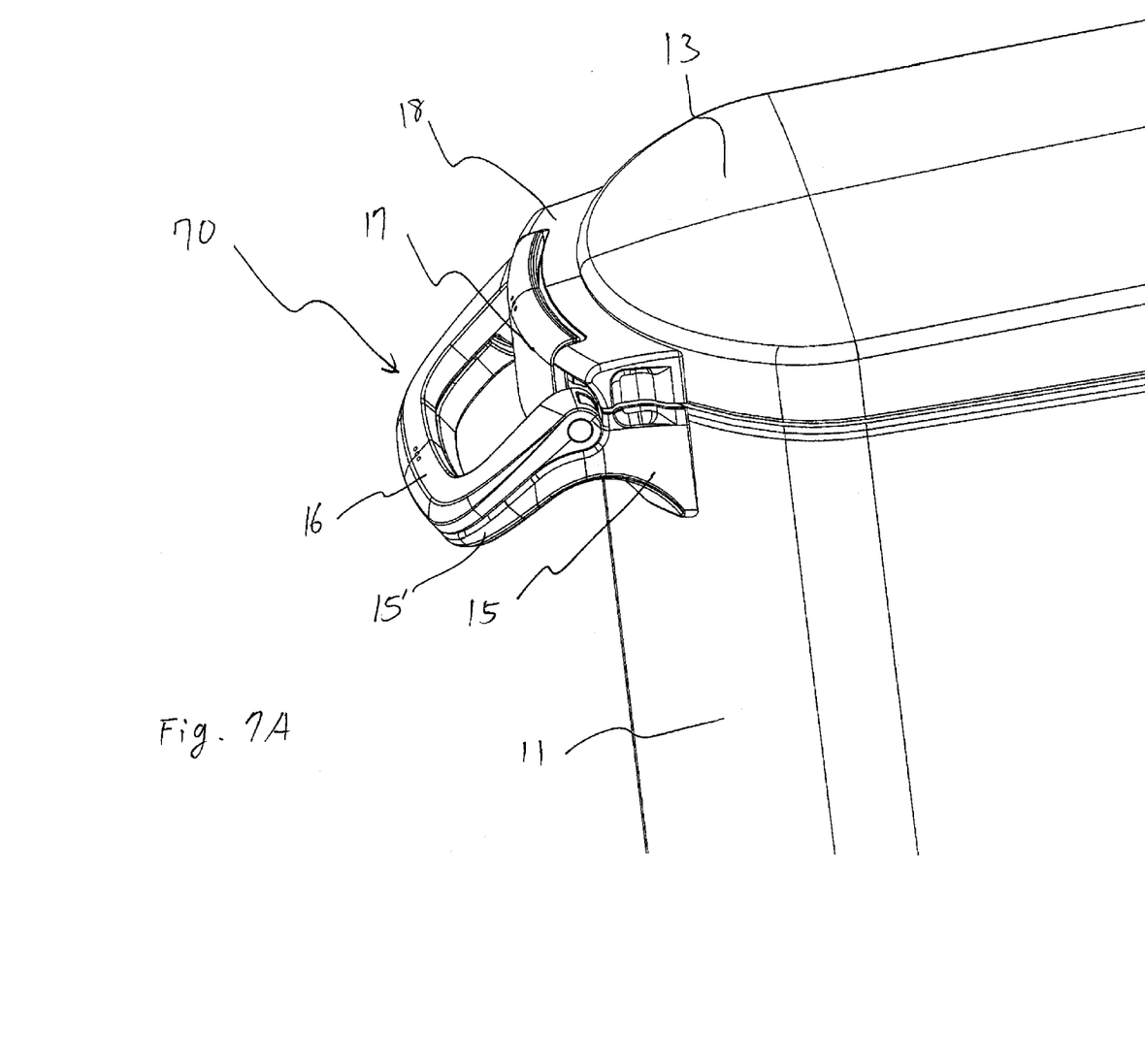
FIGS. 7A to 7C illustrate operation of a hinge mechanism of the canister.
Figure 7B:
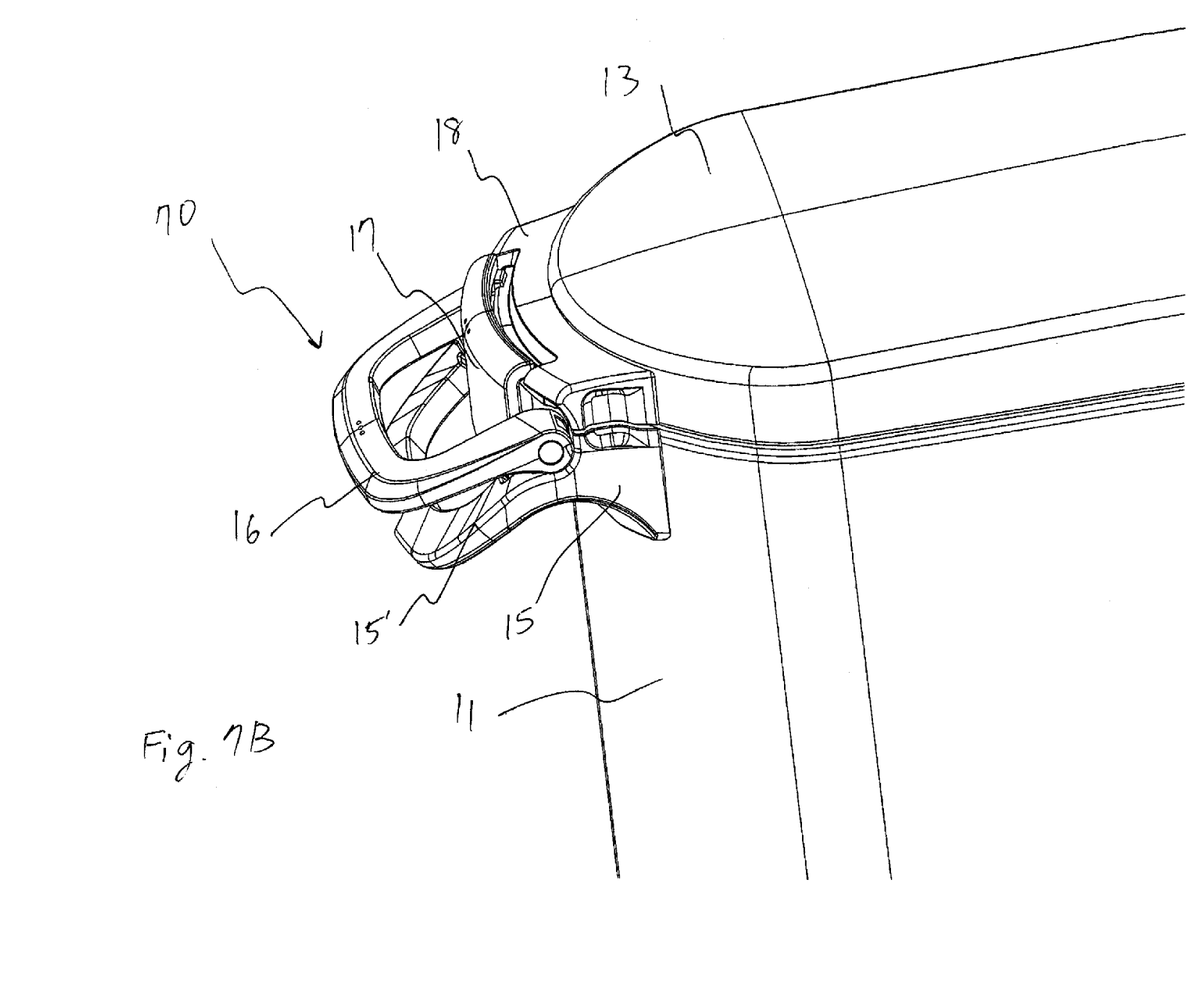
Figure 7C:
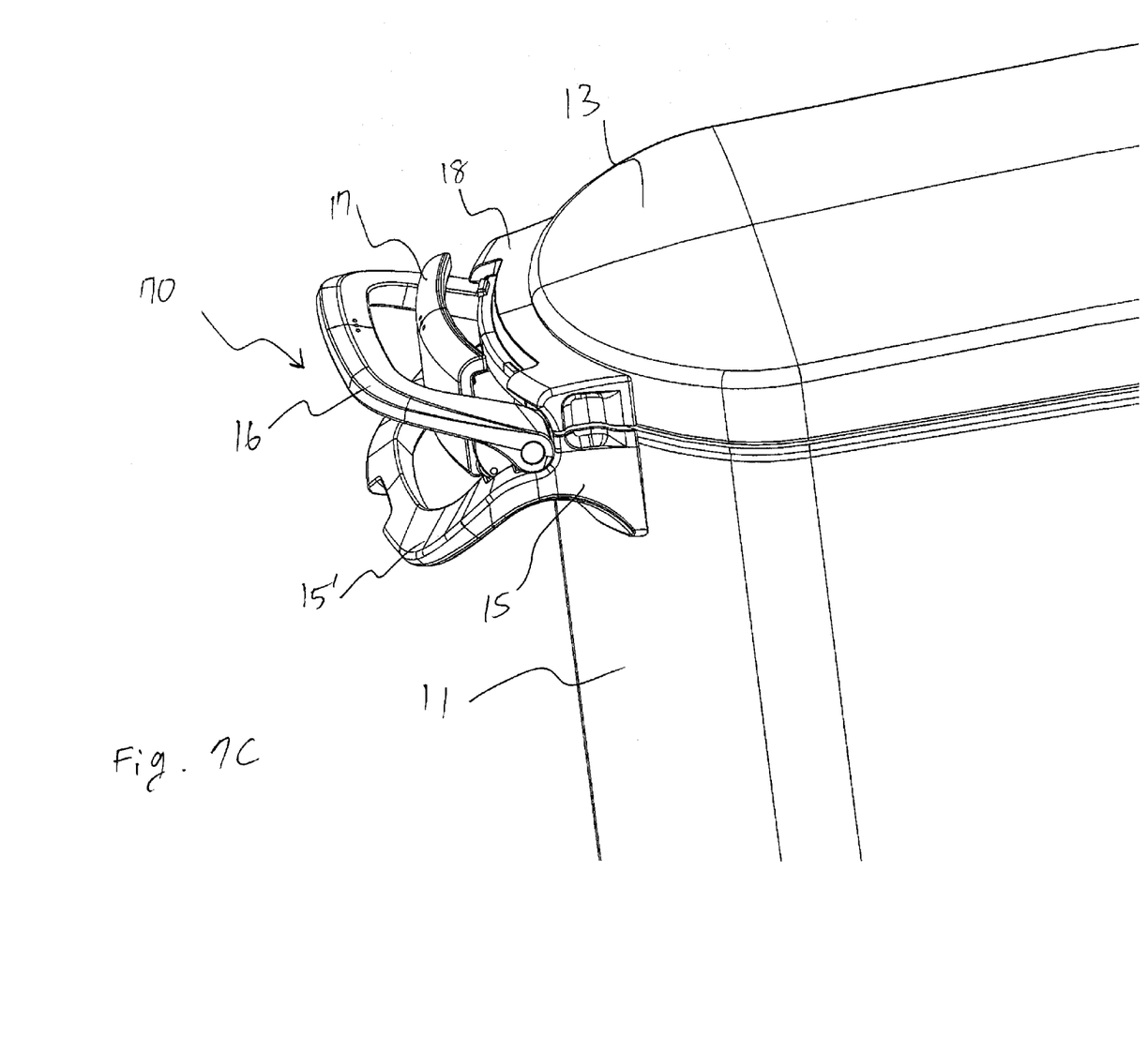

FIGS. 7A to 7C illustrate an embodiment of the handle mechanism 70 of the canister 10. FIG. 7A shows the handle mechanism 70 in "lock" position when the lid 13 is closed and locked by the handle mechanism 70. In the embodiment, the lever 16 is pivoted down into the lock position to mate with a fixed handle portion 15' of the handle frame 15, to complete a loop-shaped handle. The fixed handle portion 15' cantilevers and extends at an angle away from the body 11. The latch 17 is fully engaged with the engaging member 18 and prevents the lid 13 from opening. The fixed handle portion 15' and the lever 16 have generally similar shapes.

Figure 9A:
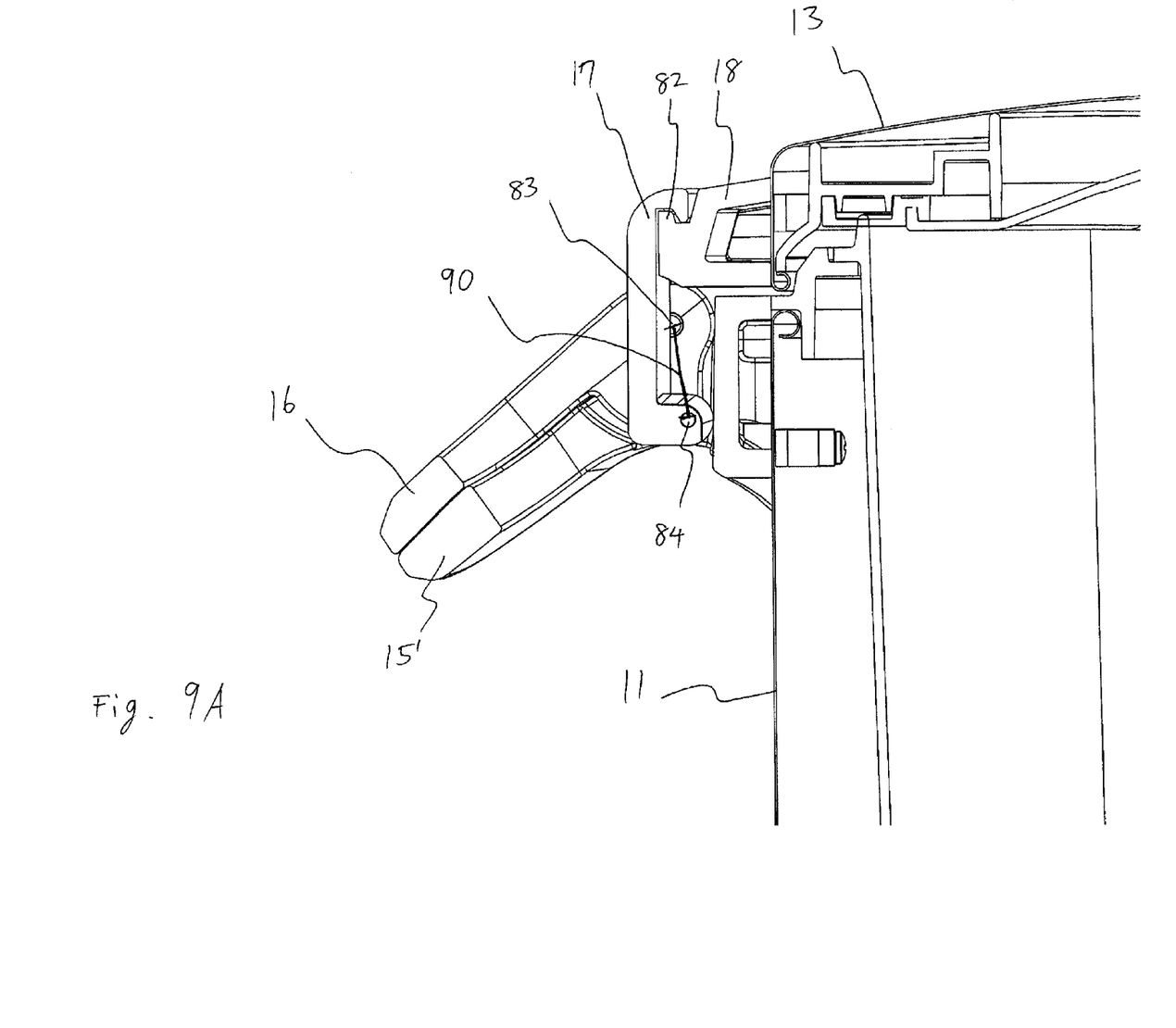
FIGS. 9A and 9B illustrate cross sections of an embodiment of a hinge mechanism of the canister.
Figure 9B:
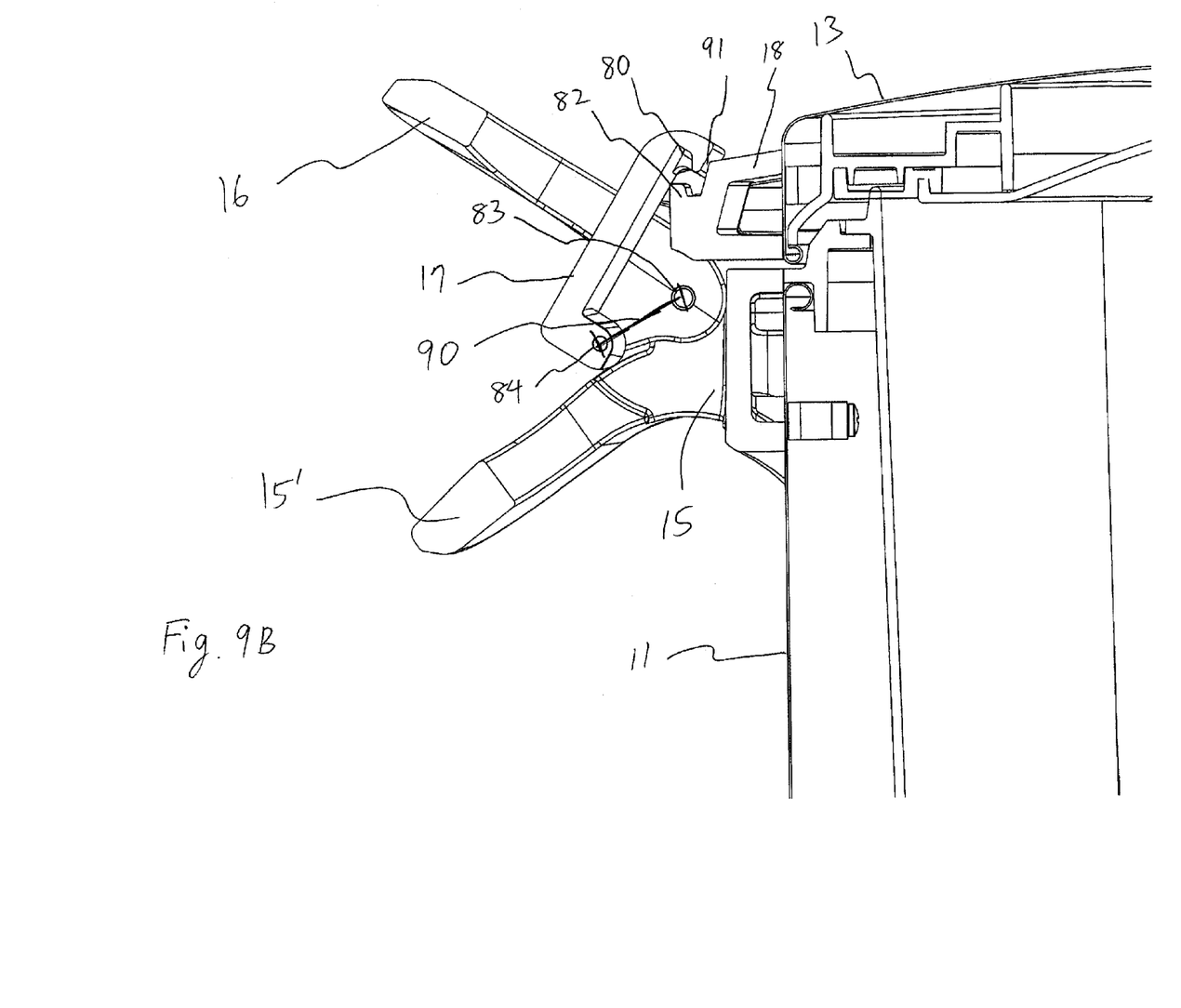

FIG. 7B shows the handle mechanism 70 when the lever 16 is slightly rotated away from the handle frame 15 in the "intermediate" position. In the embodiments, the latch 17 is pivotably connected to the lever 16. Thus, pivoting of the lever 16 further rotates the bottom of the latch 17. This rotating or pivoting motion of the latch 17 lifts the latch 17 against the engaging member 18 and disengages the latch 17. This double hinge mechanism of the lever 16 and the latch 17 are described more in detail in FIG. 9.

FIG. 7C shows the handle mechanism 70 in the "open" position, where the lever 16 is fully rotated away from the handle frame 15. In this stage, the latch 17 is entirely disengaged from the engaging member 18. In the embodiments, the complexity of the "bottom to up" actuation of the lever 16 and the further disengagement of the latch 17 helps to prevent pets and small children from opening the canister 10. However, this actuation may be quite simple for the intended users of the canister 10. Furthermore, accidentally tripping of the canister 10 may not open the lid 13 due to the required actuation of the lever 16 and the latch 17 to open the lid 13.

Figure 8A:
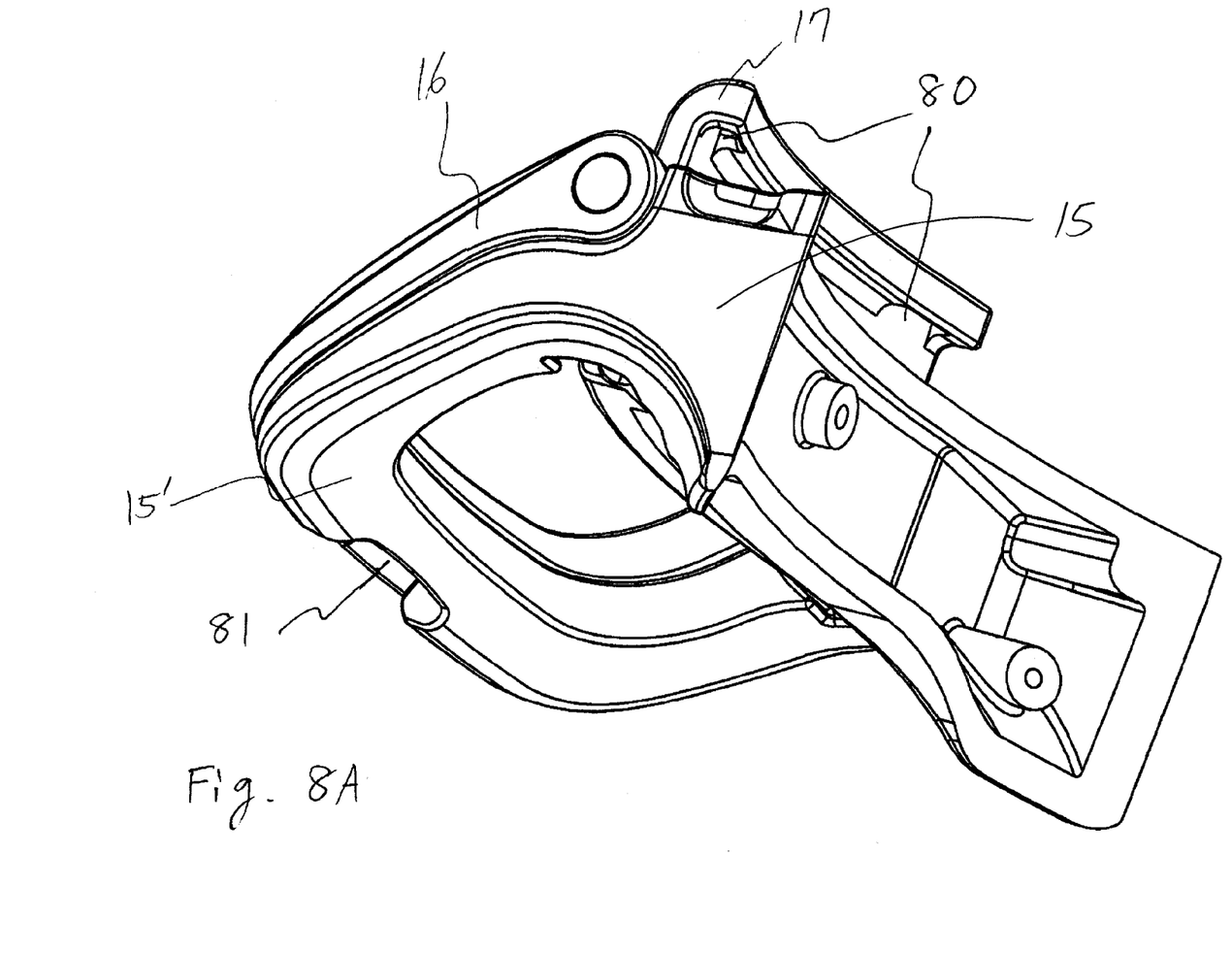
FIGS. 8A and 8B illustrate details of an embodiment of a hinge mechanism of the canister.
Figure 8B:
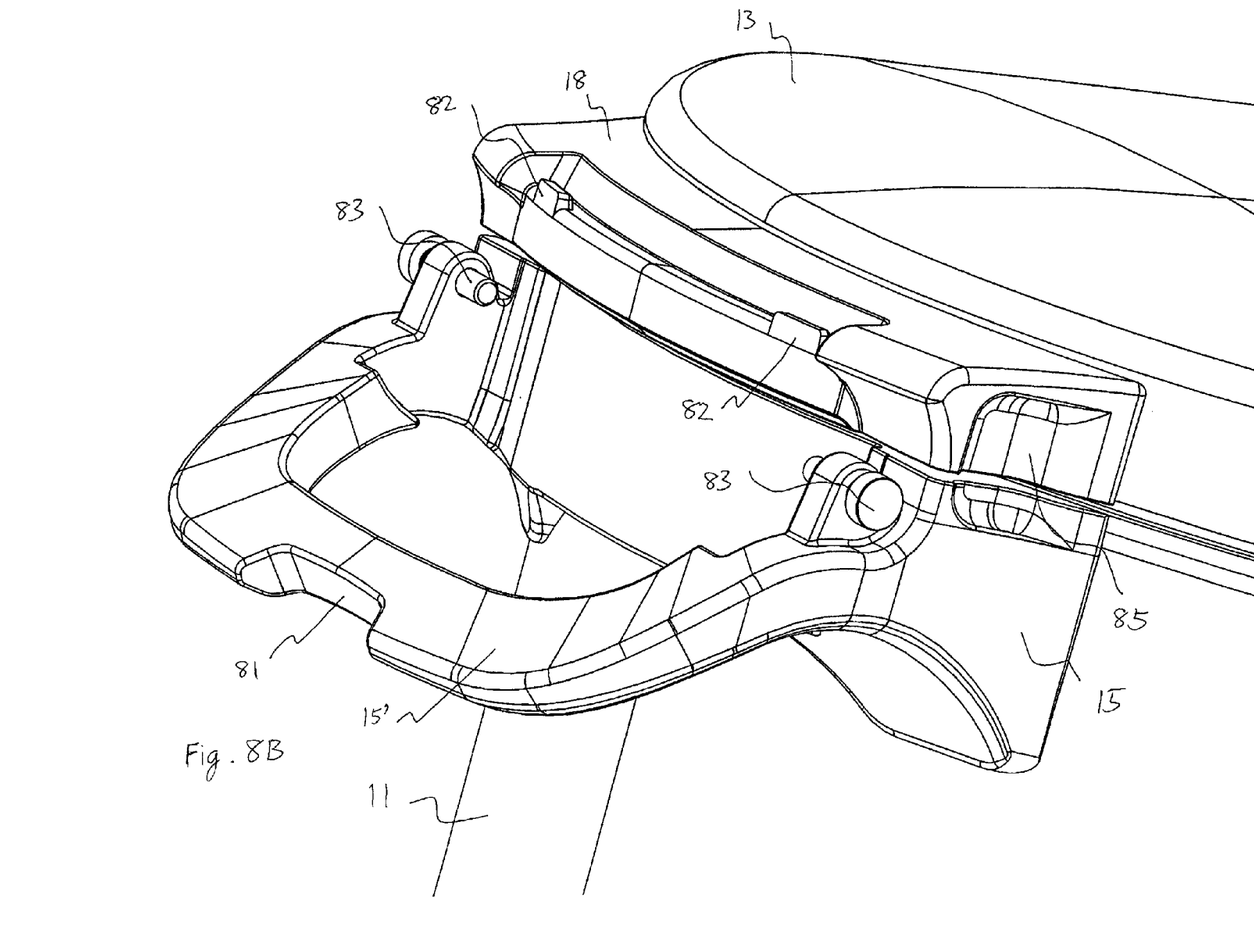

FIGS. 8A and 8B illustrate details of an embodiment of the hinge or handle mechanism 70 of the canister 10. In the illustrated embodiment of FIG. 8A, the handle mechanism 70 (with engaging member 18 not shown) is detached from the canister 10 for better illustration of details of the handle mechanism 70. In the embodiment, the latch 17 includes at least one latch recess 80. The latch recess 80 engages hooks (shown in FIG. 8B with reference numeral 82) of the engaging member 18 when the lid 13 is closed and in the lock position. When the handle mechanism 70 is in the open position (as shown in FIG. 7C) and the user wants to lock the lid 13, the user can position top portion of the latch 17 against the engaging member 18 and push the lever 16 down to pivot the latch 17 into a substantially vertical position and fully engage the latch recess 80 with the hooks 82. The handle mechanism 70 locks the lid 13 from opening in this position. The lever 16 mates with the fixed handle portion 15' of the handle frame 15 to complete a handle to facilitate handling of the canister 10. In the embodiment, the fixed handle portion 15' includes a cut 81 to reveal a portion of the lever 16. The cut 81 allows the user to easily lift the lever 16 by grabbing the portion of the lever 16 revealed by cut 81.

FIG. 8B illustrates an embodiment of the canister 10 with the lever 16 and latch 17 removed from view for better illustration of detail of the handle frame 15 and the engaging member 18 of the handle mechanism 70. The engaging member 18 includes hooks 82 for engaging with the latch recess 80 of the latch 17 when the lid 13 is closed in the locked position (as shown in FIG. 7A.) The lever 16 (not shown in FIG. 8B) is rotatably connected to the handle frame 15, which is stationary and secured to the body 11, via lever pins 83 (i.e., a pivot point). Furthermore, the latch 17 (not shown in FIG. 8B) is rotatably connected to the lever 16 via latch pins 84 (another pivot point; see FIGS. 9A and 9B) so that rotation of the lever 16 also moves the latch 17. In the embodiment, the handle mechanism 70 can further include gripping portion 85 comprising at least one recess for ease of lifting up the lid 13. In some embodiments, the lid 13 can be lifted by pulling up the engaging portion 18.

FIGS. 9A and 9B illustrate cross sections of an embodiment of the handle mechanism 70 of the canister 10. In the illustrated embodiment as shown in FIG. 9A, the lid 13 is in the closed position and locked by the handle mechanism 70. In the embodiment, the lever pins 83 and the latch pins 84 are separated by a distance 90. The distance 90 can be from about 3 cm to about 20 cm, such as about 5 cm, about 6 cm, about 7 cm, about 8 cm, about 9 cm, and about 10 cm. The distance 90 remains constant throughout the operation of the handle mechanism 70, since the lever pins 83 are secured to rigid members, the lever 16 and the handle frame 15, and the latch pins 84 are secured to rigid members, the latch 17 and the lever 16.

FIG. 9B shows a cross section of an embodiment of the canister 10 when the lid 13 is in the open position and unlocked by the handle mechanism 70. Since the lever 16 rotates about the lever pins 83, the rotation of the lever 16 causes the latch pins 84 (consequently, the bottom end of the latch 17 along the latch pins 84) to travel in a circular motion with a radius of the distance 90. During the circular travel of the latch pins 84 and bottom end of the latch 17, top portion of the latch 17 acts as a fulcrum along the engaging member 18 (this fulcrum or pivot point is represented with numeral 91.) However, further pivoting of the bottom end of the latch 17 finally disengages the recess 80 of the latch 17 from the hooks 82 of the engaging portion 18. The actuation of the lever 16 can be limited to when the latch 17 finally disengages form the engaging member 18. In some embodiments, the actuation of the lever 16 can be from about 45 degrees to about 120 degrees, such as about 60 degrees, about 70 degrees, about 80 degrees, or about 90 degrees, with respect to the fixed handle mechanism 15 as shown in FIG. 9B. After the latch 17 has been disengaged from the engaging member 18, the lever 16 can be pivoted down again along with the latch 17. After the lever 16 pivots all the way down to mate with the handle frame 15 again, the latch 17 does not interfere with the lid 13 and the lid 13 can be lifted open. When desired, the user can close the lid 13 and lock it with the handle mechanism 70 again in the process as mentioned beforehand.

It is well within the scope and spirit of the present invention, to instead provide hooks at the end of the latch 17 and complementary recesses at the engaging portion 18. Further, instead of pivoting the lever 16 on the handle frame 15, the lever 16 can instead be pivotally supported on a separate frame that is part of or attached to the body 11.

The embodiments disclosed herein, such as the utensil attachment method, lid seal method, and the handle mechanism and its actuation, are disclosed as exemplary embodiments and can be implemented in a variety of ways without deviating from the scope of the disclosure.

We claim:

1. A canister, comprising:
   a body having an opening providing access to interior of the body;
   a lid covering the opening; and
   a handle mechanism positioned on the outside of body adjacent to the opening, comprising a latch, a lever and a fixed handle portion, wherein the latch is pivotally coupled to the lever such that the latch is rotatable with respect to the lever, wherein the latch is actuated by the lever to lock and unlock the lid against the opening, and wherein the lever and the fixed handle portion combine to complete a handle of the canister.

2. The canister of claim 1, wherein the fixed handle portion cantilevers and extends in a non-vertical plane at an angle away from the body, and wherein when the lever and the fixed handle portion combine to complete the handle of the canister, the lever is pivoted at an angle away from the body about a pivot point.

3. The canister of claim 2, wherein the handle is generally loop shaped.

4. A canister, comprising:
a body having an opening providing access to interior of the body;
a lid covering the opening; and
a handle mechanism positioned on the outside of body adjacent to the opening, comprising a latch, a lever and a fixed handle portion, wherein the latch is actuated by the lever to lock and unlock the lid against the opening, wherein the lever and the fixed handle portion combine to complete a handle of the canister, and wherein the lever is pivotally supported on the outside of the body at a first pivot point, and the latch is pivotally attached to the lever at a second pivot point, wherein the distance between the first pivot point and the second pivot point remains fixed as the latch pivots with respect to the lever and the lever pivots with respect to the body.

5. The canister of claim 4, wherein the handle mechanism comprises a handle frame attached to the body, wherein the fixed handle portion cantilevers and extends from the handle frame in a non-vertical plane at an angle away from the body, wherein when the lever and the fixed handle portion combine to complete the handle of the canister, the lever is pivoted at an angle away from the body about the first pivot point, and wherein the first pivot point is fixed with respect to the handle frame.

6. The canister of claim 5, wherein the lever is pivotally supported on the handle frame, and the first pivot point is located on the handle frame.

7. The canister of claim 4, wherein:
the fixed handle portion is supported on the outside of the body,
the lever is pivotally supported on the outside of the body,
the latch is pivotally attached to the lever, the latch having an end that engages and disengages a periphery portion of the lid by pivoting the lever, and
the lever and the fixed handle portion complete the handle of the canister when the lever is pivoted to mate against the fixed handle portion.

8. The canister of claim 7, wherein the second pivot point travels in a circular arc about the first pivot point as the lever is pivoted about the first pivot point.

9. The canister of claim 8, wherein when the lever is pivoted to raise the second pivot point, the end of the latch can be pivoted towards or away from the periphery portion of the lid.

10. The canister of claim 9, wherein to lock the lid against the opening in the body, the latch is pivoted towards the periphery portion and the lever is pivoted to lower the second pivot point, thereby to engage the end of the latch against the periphery portion of the lid.

11. The canister of claim 10, wherein the end of the latch engages the periphery portion of the lid at a third pivot point, and wherein after the end of the latch initially engaged the periphery portion, further pivoting of the lever causes the end of the latch to pivot about the third pivot point.

12. The canister of claim 11, wherein the end of the latch pulls the lid against the opening of the body as the end of the latch pivots about the third pivot point and as the second pivot point is further rotated to be lowered and towards the body.

13. The canister of claim 12, wherein to unlock the lid, the end of the latch is pivoted about the third pivot point by pivoting the lever, and as the second pivot point is further rotated to be raised and away from the body, the end of the latch releases the lid from against the opening of the body.

14. The canister of claim 13, wherein further pivoting of the lever raises the second pivot point to allow the latch to be pivoted away from the periphery portion of the lid, thereby disengaging the end of the latch from the periphery portion of the lid.

15. The canister of claim 14, wherein the lever is pivoted to lower the second pivot point by lowering a distal end of the lever, and the lever is pivoted to raise the second pivot point by raising the distal end of the lever.

16. The canister of claim 1, wherein the end of the latch is provided one of a recess or a hook, and a periphery portion of the lid is provided a complementary one of a hook or a recess.

17. The canister of claim 16, wherein the lid comprises an engagement member attached to the periphery portion of the lid.

18. The canister of claim 1, wherein the lid is pivotally attached to the body.

19. The canister of claim 1, further comprising a utensil removably attached to an underside of the lid.

20. The canister of claim 19, wherein the utensil is a scoop.

21. The canister of claim 2, wherein the lever is pivotally supported on the outside of the body at a first pivot point, and the latch is pivotally attached to the lever at a second pivot point, wherein the lever has a long lever portion and a short lever portion about the first pivot point, wherein the second pivot point is located on the short lever portion, wherein the first pivot point acts as a fulcrum between the long lever portion and the short lever portion having the second pivot point, with the long lever portion and the second pivot point on different sides of the fulcrum along a sectional centerline of the long lever portion and second lever portion.

22. The canister of claim 4, wherein the lever has a long lever portion and a short lever portion about the first pivot point, wherein the second pivot point is located on the short lever portion, wherein the first pivot point acts as a fulcrum between the long lever portion and the short lever portion having the second pivot point, with the long lever portion and the second pivot point on different sides of the fulcrum along a sectional centerline of the long lever portion and second lever portion.

\* \* \* \* \*